3,329,919
CONTROL ASSEMBLY
Darrell H. Lau, Columbus, Nebr., assignor to Dale Electronics, Inc., Columbus, Nebr.
Filed Mar. 29, 1965, Ser. No. 443,598
15 Claims. (Cl. 338—68)

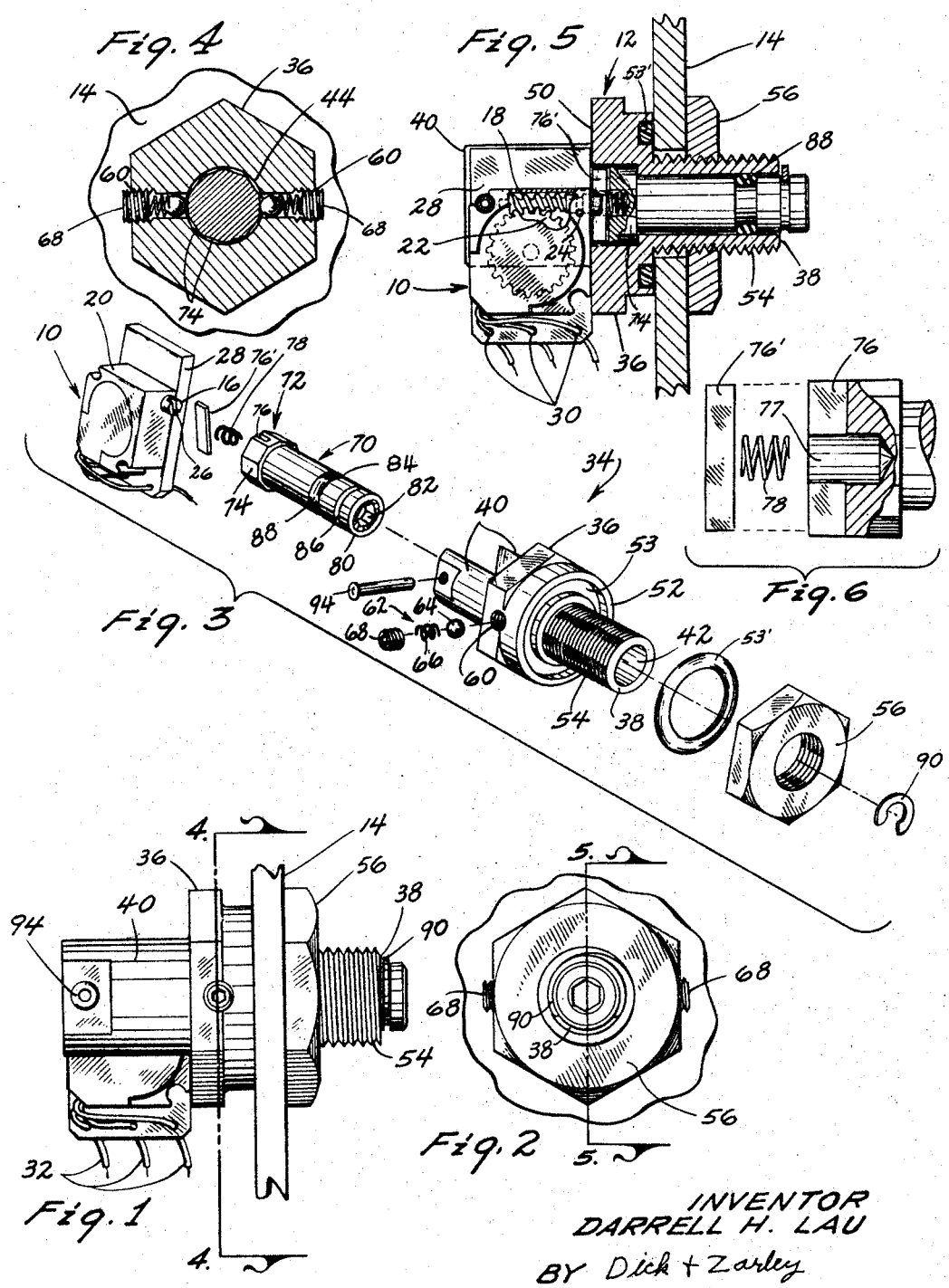

This invention relates to a control assembly and in particular to a control capable of making fine adjustments on an associated control unit.

A principal object of this invention is to provide a control assembly capable of adjusting a control unit in precise predetermined amounts as may be desired.

A related object of this invention is to provide a control assembly for adjusting control units which will always be yieldingly locked in a given setting.

Another related object of this invention is to provide a remote control assembly for control of units wherein the control assembly is capable of supportingly engaging the control unit on one side of a panel and yet be actuated from the opposite side or the front side of a panel.

A further object of this invention is to provide a drive means in a control assembly which is self-aligning when in engagement with a control element on a control unit.

A still further object of this invention is to provide a control assembly which utilizes a minimum number of parts and may be quickly assembled in combination with a control unit and on a control panel if desired.

A further related object of this invention is to provide a control assembly wherein the torque required for its operation may be selectively varied.

A further object of this invention is to provide a control assembly which is capable of protecting the control element in the control unit from dust and moisture.

A still further object of this invention is to provide an adjustable control assembly that is economical in manufacture, durable in use, and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a side elevational view of the control assembly in combination with a potentiometer, both of which are mounted on a control panel in a position of use;

FIG. 2 is a right end view of the unit as seen in FIG. 1;

FIG. 3 is an exploded perspective view of the unit of FIG. 1 less the control panel;

FIG. 4 is a cross-sectional view taken along line 4—4 in FIG. 1;

FIG. 5 is a fragmentary side elevational view similar to FIG. 1 but showing important internal construction of the assembled combination; and FIG. 6 is an enlarged fragmentary, exploded view of the driver end of the control assembly drive shaft.

The embodiment of this invention illustrated in the drawings includes an adjustable potentiometer 10 (FIG. 3) of the type fully described in co-pending application of Michael C. Layland, Ser. No. 240,839 filed Nov. 29, 1962. As best seen in FIG. 5, the adjustable potentiometer 10 is secured to a control assembly 12 mounted on a control panel 14.

The potentiometer 10 is provided with a lead screw 16 having a worm portion 18 on its inner end inside the potentiometer housing 20 for continuous engagement with a worm gear 22. A pin 24 maintains the lead screw 18 in a stationary longitudinal position within the potentiometer housing 20. The outer end of the lead screw 16 is provided with a slot 26 which ordinarily receives a screw driver or similar tool for making adjustments to the potentiometer.

The potentiometer housing 20 is mounted on a base plate 28 having a series of three holes 30 at one end thereof to receive the potentiometer lead wires 32 (FIG. 1).

The control assembly 12 (FIG. 5) is shown in FIG. 3 to include a body member 34 having a bolt head center portion 36 with a bearing stud portion 38 extending from one side thereof and a pair of parallel spaced apart leg portions 40 forming a yoke extending from the opposite side of the center portion 36. The bearing stud portion 38 is provided with an opening 42 extending therethrough in coaxial alignment with an opening 44 extending through the center portion 36 (FIG. 4). The yoke legs 40 are spaced apart on opposite sides of the opening 44. Outwardly of the legs 40 a flat bearing surface 50 is presented on the rear side of the center head portion 36 and similarly, a flat bearing surface 52 with an annular groove 53 formed therein to receive an O-ring 53' is presented on the front or forward side outwardly of the bearing stud 38. When the control assembly is mounted in a panel the O-ring 53' provides a dust and moisture seal. The external surface of the bearing stud 38 is provided with threads 54 for engagement with a mounting nut 56.

On diametrically opposite sides of the center head portion 36, aligned holes 60 are provided and receive detent assemblies 62 (FIG. 3). The detent assemblies 62 include a ball bearing detent 64 in bearing engagement with a coil spring 66 held in position by a set screw 68.

A drive shaft 70 is positioned in the aligned openings 42 and 44 and includes an inner end portion 72 having a plurality of cam indexing surfaces 74 uniformly disposed around its peripheral surface. The inner end face of the shaft 70 is formed with a diametrically extending slot 76 which receives a bar tongue 76'. A bore 77 is formed in the inner end of the shaft 70 and is coaxial with the openings 42 and 44 in the body member 34. A coil spring 78 is disposed between the bar 76' and the inner end of the bore 77. The bore 77 is formed with a diameter which corresponds closely to the diameter of the outer end of the lead screw 16. Thus, the lead screw 16 when positioned in the bore 77 the bar 78' is received in the lead screw slot 26. Accordingly it is assured that lead screw 16 and shaft 70 will always be concentrically arranged relative to each other because the lead screw is confined by the bore 77 in the shaft 70 and the only direction it can move is the axial direction. Accordingly, the lead screw axis and the axis of shaft 70 will always be coaxial thereby assuring a smooth rotation of the lead screw 16 without any binding occurring between it and the bar 76.

The spring loading of the shaft 70 assures that the bar 78' is not mis-aligned in an axial direction since the spring yieldingly presses the bar 76' into the slot 26 in the lead screw 16.

The opposite end 80 of the shaft 70 is provided with a cavity 82 so shaped to matingly engage an allen wrench. Between the ends 72 and 80, continuous annular grooves 84 and 86 are formed in the shaft to receive an O-ring 88 and a snap lock element 90 (FIG. 5). The O-ring 88 seats against the inner surface of the opening 42 in the bearing stud 38 while the snap lock element 90 is adapted to bear against the outer end of the bearing stud element 38.

When the shaft 70 is inserted into the body member 34 as illustrated in FIG. 5, the inner end 72 dwells within the bolt head portion 36 and the detent balls 64 yieldably bear against the cam surfaces 74 on both sides of the shaft 70. Thus, it is quite apparent that by appropriate adjustment of the set screws 68 a high torque may be required to rotate the shaft 70 to overcome the forces of the detents 62. Depending on the amount of rotation desired during each incremental turn of the shaft 70, any number of index or cam surfaces 74 may be formed on the inner end 72 and thus the greater number of surfaces the smaller the angle of rotation as one cam surface 74 moves out of engagement with a detent ball 64 and the next cam surface 74 moves into engagement with the detent ball.

With the control assembly 34 assembled, the potentiometer 10 mounted on the base plate 28 is inserted between the legs 40 and riveted into place by the rivet 94 (FIG. 1). Accordingly, it is seen that the bar 76' in the shaft 70 is received in the slot 26 on the lead screw control element 16 and the inner face of the potentiometer housing 20 and the base plate 28 bear against the rear face 50 of the bolt head portion 36 to thereby form an integral unit. By extending the bearing stud portion 38 through an opening in the panel 14 and placing the mounting nut 56 on the bearing stud the assembled unit may be readily locked into its position on the panel 14. Thereafter, when it is desired to vary the resistance in the potentiometer 10 it is only necessary to rotate the shaft 70 with an allen wrench or the like in the cavity 82 since the rotational forces will be directly transmitted to the lead screw 16 on the potentiometer 10. It is apparent that it may be readily ascertained how many increments or "clicks" the shaft 70 should be turned to give the desired amount of resistance in the potentiometer 10 and thereafter the desired setting may be quickly made by turning the shaft 70 and listening for the clicks as the cam surfaces move into and out of engagement with the ball detents 64. Moreover, the torque required to rotate the shaft 70 may be selectively varied by adjusting the set screws 68.

It is to be further understood that although a potentiometer 10 has been shown in use with the control assembly 12, any other control unit may be operated in the same manner.

Some changes may be made in the construction and arrangement of my control assembly without departing from the real spirit and purpose of my invention, and it is my intention to cover by my claims, any modified forms of structure or use of mechanical equivalents which may be reasonably included within their scope.

I claim:

1. A control assembly, comprising, a body member having an opening therethrough, a shaft rotatably received in said opening, flat cam surfaces within said shaft, detent means on said body member for engagement with said cam surfaces, spring means for yieldably maintaining said detent means in bearing contact with same cam surfaces, means on said shaft adapted to engage an etxernal adjustable control element.

2. The control assembly of claim 1 wherein said cam surfaces are uniformly disposed around and on the exterior of a portion of said shaft.

3. The control assembly of claim 1 and an external adjustable control having a housing, means is provided for operatively securing the housing of said external control element against movement relative to said body member.

4. In combination, a housing having a control element, and adjustment means on said control element being exposed on the exterior of said housing; a control assembly having a body member with an opening therethrough, a shaft rotatably received in said opening, cam surfaces on said shaft, detent means on said body member for engagement with said cam surfaces, spring means for yieldably maintaining said detent means in bearing contact with said cam surfaces, means on said shaft lockingly engaging said exposed adjustment means on said control element for selective adjustment thereof, and means limiting rotation of said body member and housing upon rotation of said shaft .

5. The combination of claim 4 wherein said means for limiting rotation includes a pair of leg means on said body member embracing said housing to limit movement of said housing relative to said body member.

6. The combination of claim 5 wherein said cam surfaces are uniformly disposed around and on the exterior of an end poriton of said shaft and upon rotation of said shaft said detent means will move out of engagement with one cam surface and into engagement with an adjacent cam surface thereby moving said control element a predetermined distance as each of said cam surfaces successively move against said detent means.

7. In combination, an adjustable electrical component having a housing and a control element extending therefrom, a control assembly including a body member having a head portion with an opening extending therethrough, a bearing stud portion extending from one end of said head portion and a pair of spaced apart leg portions extending from the other end of said head portion, said bearing stud portion having an opening therethrough being coaxial with the opening in said head portion and said leg portions being disposed on opposite sides of said opening through said head portion, said component housing being received between said leg portions and arranged with said control element extending towards said opening through said head portion, a shaft rotatably received in said openings in said head and bearing stud portions, cooperating interlocking surfaces formed on the outer end of said control element and the inner end of said shaft, said interlocking surfaces being in engagement with each other, a plurality of cam surfaces uniformly spaced around the periphery of a portion of said shaft, at least one spring biased detent means provided in said body member for yieldable locking engagement with one of said cam surfaces, said detent means adapted to succesively engage each of said cam surfaces as said shaft is rotated one complete revolution thereby rotating said control element a predetermined angle as successive cam surfaces engage said detent means.

8. The combination of claim 7 and means is provided for maintaining said component housing in engagement with said other end of said head portion and between said leg portions, and said one end of said head portion having a surface adapted to bear against the rear side of a panel member and said bearing stud portion being adapted to extend through a panel member.

9. The combination of claim 7 wherein said interlocking surface on said control element includes a slot and said cooperating interlocking surface on said shaft includes a tongue portion received in said slot.

10. The combination of claim 7 wherein said electrical component is a potentiometer having a worm gear and said control element is provided with a worm portion on the inner end thereof for continuous engagement with said worm gear.

11. A control assembly, comprising a body member having an opening therethrough, a rotatable shaft received in said body member, said shaft having an axial bore and a diametrical slot formed in one end, a tongue bar movably received in said slot, said bore being adapted to receive the slotted head of a screw-type element and said tongue bar adapted to engage the slot in the head of said screw-type element.

12. In combination, a control unit having a control element, said control element having an exposed head portion with a slot formed therein; and a control assembly having a body member having an opening therethrough, a rotatable drive shaft on said body member in axial alignment with said control element head portion, said drive shaft having one end with a diametrical slot, an axial bore formed in said one end of said drive shaft, said head portion of said control element being received in said bore and, tongue for extending across said bore and received in said diametrical slot, said tongue bar being in engagement with said slot in said head portion, and means for securing said shaft in said body member and means for limiting said control unit against rotation as said shaft is rotated.

13. The combination of claim 12 and means for interconnecting said control unit and the body member of said control assembly for limiting relative movement therebetween.

14. The combination of claim 12 and a spring means in said axial bore engaging said tongue bar for yieldingly maintaining said tongue bar in engagement with said control element head portion.

15. The structure of claim 11 and a spring means being positioned in said bore and in engagement with said tongue bar for yieldingly urging said tongue bar outwardly of said drive shaft.

References Cited

UNITED STATES PATENTS

| | | | |
|---|---|---|---|
| 2,399,906 | 5/1946 | Bentley | 200—6 |
| 2,884,505 | 4/1959 | Strain et al. | 338—196 |
| 3,150,635 | 9/1964 | Root | 338—196 |
| 3,183,739 | 5/1965 | Rajewski et al. | 74—527 |
| 3,193,653 | 7/1965 | Cope | 200—166 |
| 3,255,796 | 6/1966 | Tobey | 74—527 |
| 3,264,594 | 8/1966 | Layland | 338—174 |

RICHARD M. WOOD, *Primary Examiner.*

W. D. BROOKS, *Assistant Examiner.*